United States Patent [19]
Hammersley et al.

[11] Patent Number: 5,392,433
[45] Date of Patent: Feb. 21, 1995

[54] METHOD AND APPARATUS FOR INTRAPROCESS LOCKING OF A SHARED RESOURCE IN A COMPUTER SYSTEM

[75] Inventors: Scott D. Hammersley; Arthur D. Smet; Peter M. Wottreng, all of Rochester, Minn.

[73] Assignee: International Business Machines Corporation, Armonk, N.Y.

[21] Appl. No.: 951,482

[22] Filed: Sep. 25, 1992

[51] Int. Cl.⁶ .................. G06F 13/00; G06F 12/16
[52] U.S. Cl. .................. 395/725; 360/DIG. 1; 360/230.3; 360/246.6; 360/246.8; 395/650
[58] Field of Search .......... 395/725, 425, 650; 364/134

[56] References Cited

U.S. PATENT DOCUMENTS

| | | | |
|---|---|---|---|
| 3,573,736 | 4/1971 | Schlaeppi | 395/725 |
| 4,399,504 | 8/1983 | Obermarck et al. | 395/725 |
| 4,435,766 | 3/1984 | Haber et al. | 395/725 |
| 4,574,350 | 3/1986 | Starr | 395/725 |
| 4,587,609 | 5/1986 | Boudreau et al. | 395/725 |
| 4,604,694 | 8/1986 | Hough | 395/650 |
| 4,665,484 | 5/1987 | Nanba | 395/650 |
| 4,709,326 | 11/1987 | Robinson | 395/725 |
| 4,716,528 | 12/1987 | Crus et al. | 395/725 |
| 4,809,168 | 2/1989 | Hennessy et al. | 395/650 |
| 4,965,719 | 10/1990 | Shoens et al. | 395/650 |
| 4,975,833 | 12/1990 | Jinzaki | 395/425 |
| 5,012,409 | 4/1991 | Fletcher et al. | 395/650 |
| 5,029,169 | 7/1991 | Sanyk | 395/575 |
| 5,063,503 | 11/1991 | Jordan, Jr. | 395/725 |
| 5,063,504 | 11/1991 | Jordan, Jr. | 395/725 |
| 5,161,227 | 11/1992 | Dias et al. | 395/725 |
| 5,202,971 | 4/1993 | Henson et al. | 395/425 |
| 5,226,143 | 7/1993 | Baird et al. | 395/425 |
| 5,287,521 | 2/1994 | Nitta et al. | 395/725 |

OTHER PUBLICATIONS

"Threads Extension For Portable Operating Systems" IEEE Computer Society, Feb. 26, 1992.

*Primary Examiner*—Jack B. Harvey
*Assistant Examiner*—Ayaz R. Sheikh
*Attorney, Agent, or Firm*—Curtis G. Rose; Steven W. Roth

[57] ABSTRACT

A method and apparatus for the intraprocess locking of a shared resource in a computer system is disclosed. A computer system operates under the control of an operating system. The operating system supports the asynchronous execution of a plurality of tasks, referred to herein as processes. Each process is capable of being executed by a plurality of asynchronously executing programs. In addition to assuring that only one process may use a shared computer resource, such as a magnetic storage device, tape drive, printer, software module, message queue, etc, at one time, the operating system also grants access to a shared computer resource at the level of a program operating within a process. When one program executing within a process accesses a shared computer resource, it requests that the operating system lock out all other programs executing asynchronous within that process, as well as other processes executing within the computer system, from that shared resource. Different types of locks, such as exclusive and shared locks, are also supported.

12 Claims, 11 Drawing Sheets

METHOD AND APPARATUS FOR INTRAPROCESS LOCKING OF A SHARED RESOURCE IN A COMPUTER SYSTEM

FIELD OF THE INVENTION

This invention relates to the data processing field. More specifically, this invention relates to the intraprocess locking of a shared resource in a computer system.

BACKGROUND OF THE INVENTION

Early computer systems were capable of only performing a single task or process at a time. Computer resources in such single tasking environments, such as magnetic storage, tape, printers, etc, were used exclusively by the single task currently running on the computer system. When the task completed, the computer resources were available for the next task that would run on the computer system. There is no reason to "lock" a computer resource in such an environment, since only one task is executing at a time. Stated another way, the granularity of the "lock" of a computer resource could be considered to be at the level of the computer system itself.

The DOS operating system is an example of the simple world of a single tasking environment that existed in the personal computer industry for many years. But computer users demanded more powerful computers that had the ability to perform multiple tasks or processes at one time. Much more complex operating systems, such as UNIX, Windows, and OS/2, gave users the ability to perform many different tasks concurrently. For example, a Windows user could now display more than one "window" on his computer display. Each window has the independent ability to ask the computer to execute its task. Therefore, if more than one window requested that the computer execute its task at the same time, the computer would be operating in a multitasking mode.

When computers operate in multitasking mode, care must be taken to assure that a computer resource can be responsibly shared between tasks. Windows and OS/2 control access to a resource by "locking" out all other tasks when one task is using the resource. For example, a Windows user may be running Lotus 1-2-3 in one window and TurboTax in another window. Both Lotus 1-2-3 and TurboTax may independently be trying to execute a task that uses the magnetic storage device to write data to the same storage location at the same time. Windows would prevent the possible loss or corruption of data from this occurring by denying TurboTax the ability to write to the magnetic storage device if Lotus 1-2-3 was using it. The granularity of the computer resource lock used by UNIX, Windows and OS/2 is at the level of the task or process.

While lock granularity at the task or process level is adequate for multitasking computer systems known today, computer users will soon once again be demanding more power and speed from their computer systems. Lock granularity at the task or process level may impose a restriction on increasing the power and speed of computer systems to a level deemed necessary by computer users, or it may impact the data integrity, system integrity, or operation of these more powerful systems.

SUMMARY OF THE INVENTION

It is a principle object of the invention to enhance the operation of a computer system.

It is another object of the invention to provide intraprocess locking of a shared resource in a computer system.

These and other objects are accomplished by the method and apparatus for intraprocess locking of a shared resource in a computer system disclosed herein.

A method and apparatus for the intraprocess locking of a shared resource in a computer system is disclosed. A computer system operates under the control of an operating system. The operating system supports the asynchronous execution of a plurality of tasks, referred to herein as processes. Each process is capable of being executed by a plurality of asynchronously executing programs. In addition to assuring that only one process may use a shared computer resource, such as a magnetic storage device, tape drive, printer, software module, message queue, etc, at one time, the operating system also grants access to a shared computer resource at the level of a program operating within a process. When one program executing within a process accesses a shared computer resource, it requests that the operating system lock out all other programs executing asynchronously within that process, as well as other processes executing within the computer system, from that shared resource. Different types of locks, such as exclusive and shared locks, are also supported.

DESCRIPTION OF THE PREFERRED EMBODIMENT

Figure 1:
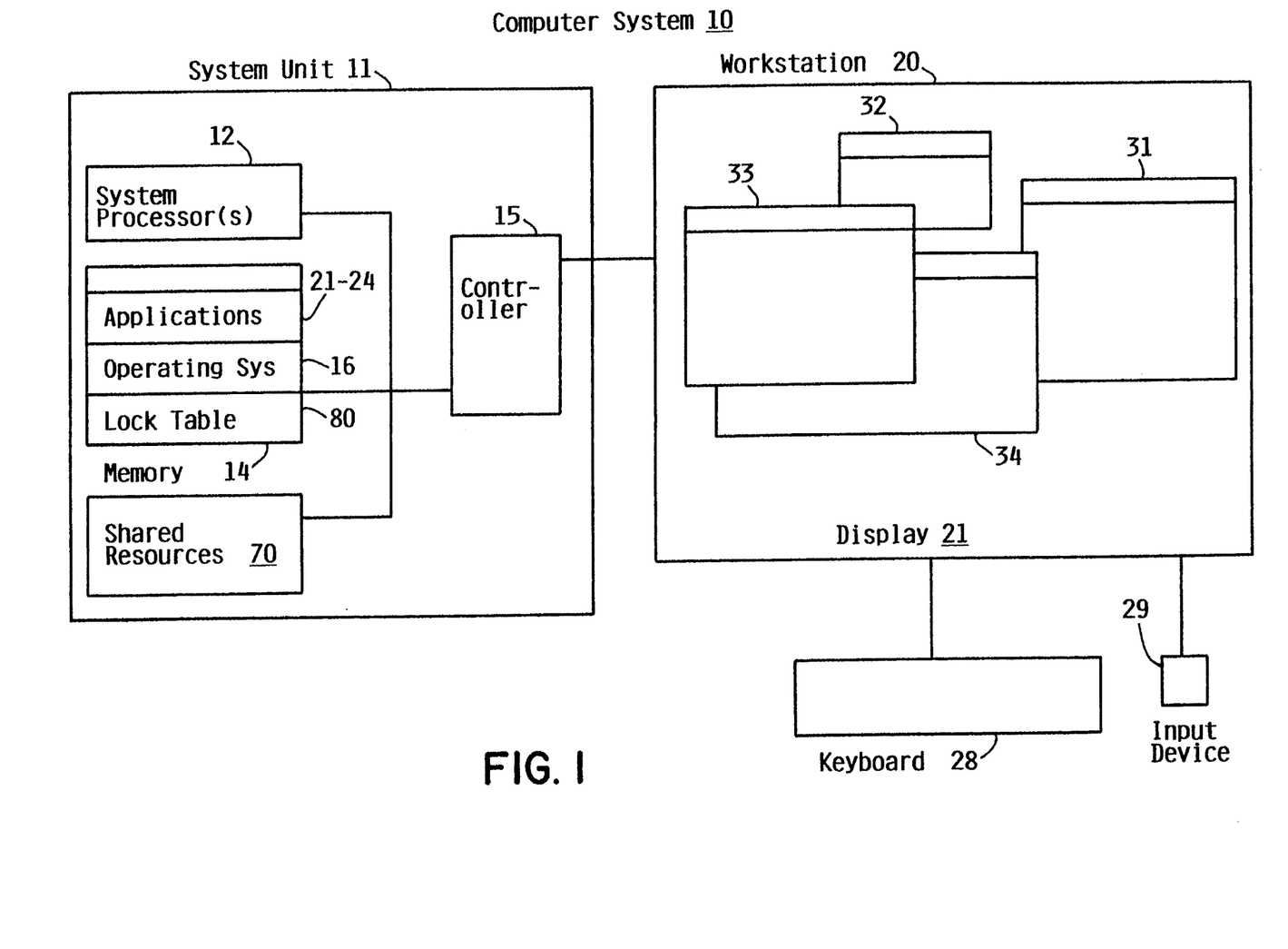
FIG. 1 shows a block diagram of the computer system of the invention.

FIG. 1 shows a block diagram of computer system 10 of the invention. System unit 11 contains one or more processors 12 connected to shared resource 70, memory 14, and workstation controller 15. A portion of memory 14 is used by operating system 16, and also stores lock table 80. Processor(s) 12 is suitably programmed to carry out this invention, as described in more detail in the flowcharts of FIGS. 5A-5B and FIG. 6. System unit 11 is connected to workstation 20. Workstation 20 has display 21, keyboard 28, and input device 29. Display 21 contains windows 31-34.

In the preferred embodiment, computer system 10 is an IBM AS/400 generally available to the public as of the filing date, where operating system 16 is Version 2, Release 2 of OS/400, except that operating system 16 also supports the POSIX draft industry standard for threads, known and documented to the public as of the filing date of this invention as the Draft Standard For Threads Extension For Portable Operating Systems, P1003.4a/D6, published Feb. 26, 1992 by IEEE. Workstation 20 is preferably an IBM PS/2 model 80. Input device 29 is preferably a mouse but may also be a track ball, light pen, or other input device. Computer system 10 also contains application software 21-24, as displayed in windows 31-34. When running, this software is partially or completely installed in memory 14 and executed by processor(s) 12. Shared resource 70 is, in the preferred embodiment, a segment of data on a magnetic storage device, but could be many other things as well, as will be discussed later.

The terms "process" and "program" have a variety of meanings within various facets of the computer industry. It is important for the reader to understand that the terminology used herein has a specific meaning understood by those skilled in the specific art of this invention, such as those familiar with POSIX. For purposes of this invention, a "process" is defined as an address space (range of available addresses) and one or more threads of control that execute within that address space and its required system resources. A "thread" is a single sequential flow of control within a process. A "program" is a set of instructions that tell a process what to do. Within a single process, all threads and programs share the same address space. A process does not share an address space with any other process. Some computer platforms (i.e. UNIX, OS/2) support multiple threads executing within a single program. Other computer platforms (i.e. AS/400 running V2R2 or earlier) supports single threads executing within multiple programs. No computer platform is currently publicly available that supports multiple threads executing within multiple programs. Multiple threads executing within multiple programs, stated in an equivalent manner, is multiple asynchronous programs running within a single process.

Figure 2A:
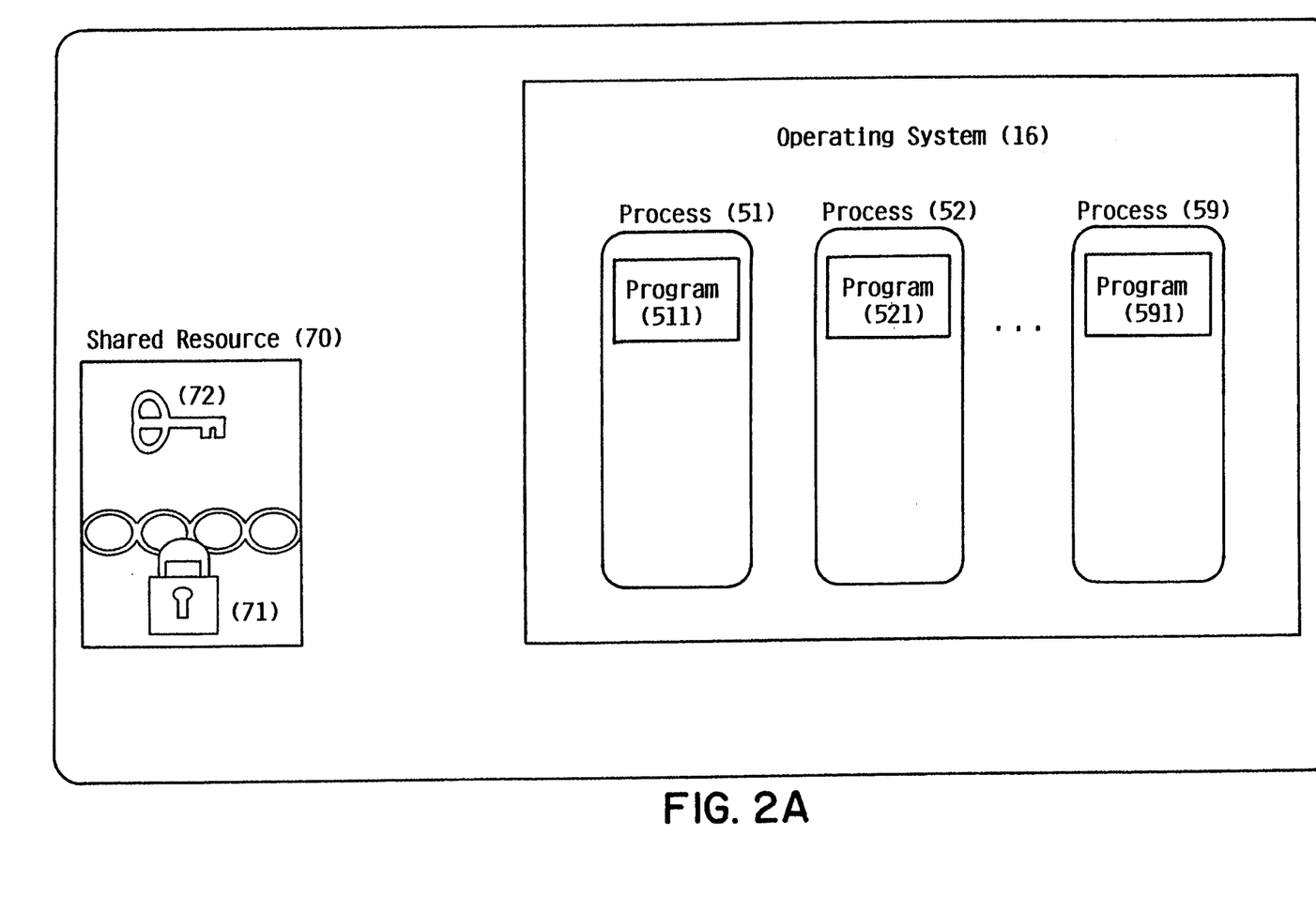
FIGS. 2A-2B show an example of process level locking of a shared computer resource in a prior art computer environment capable of supporting multiple processes.
Figure 2B:
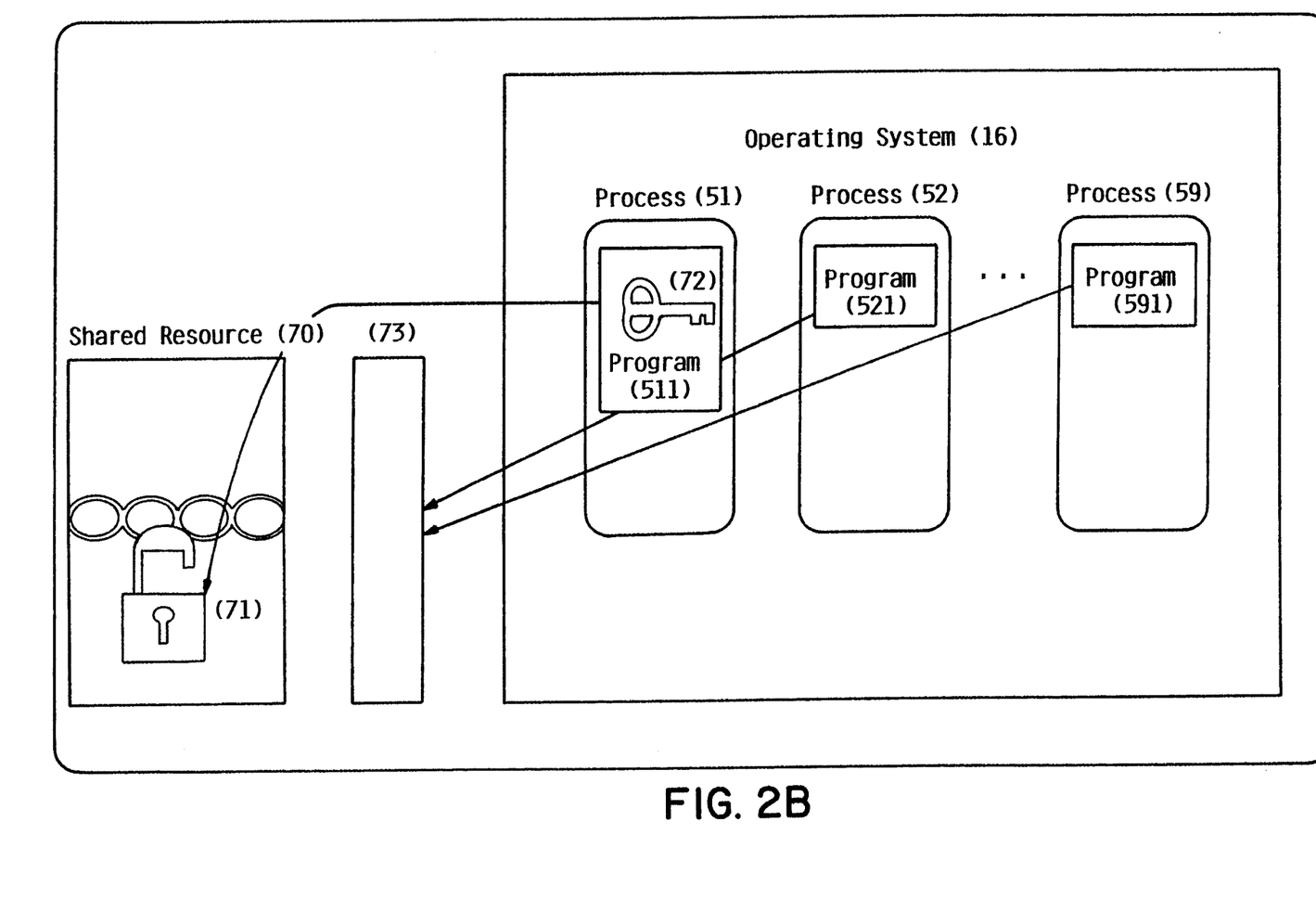

FIGS. 2A-2B shows an example of process level locking of a shared computer resource in a multitasking computer environment known in the prior art. As shown in FIG. 2A, operating system 16 manages processes 51-59. Shared resource 70 is currently not being used by any process 51-59, as is shown schematically by lock 71 and key 72 being located within shared resource 70. FIG. 2B shows what happens when process 51 wants to use shared resource 70. Operating system 16 symbolically moves key 72 from shared resource 70 to process 51. Process 51 keeps key 72 until it no longer needs shared resource 70. Until that time, operating system 16 prevents processes 52-59 from accessing shared resource 70, as is symbolically represented by brick wall 73. Those skilled in the art appreciate that lock 71, key 72, and brick wall 73 are not actually physical objects but are symbolic representations of the locking operation performed by operating system 16.

Figure 3A:
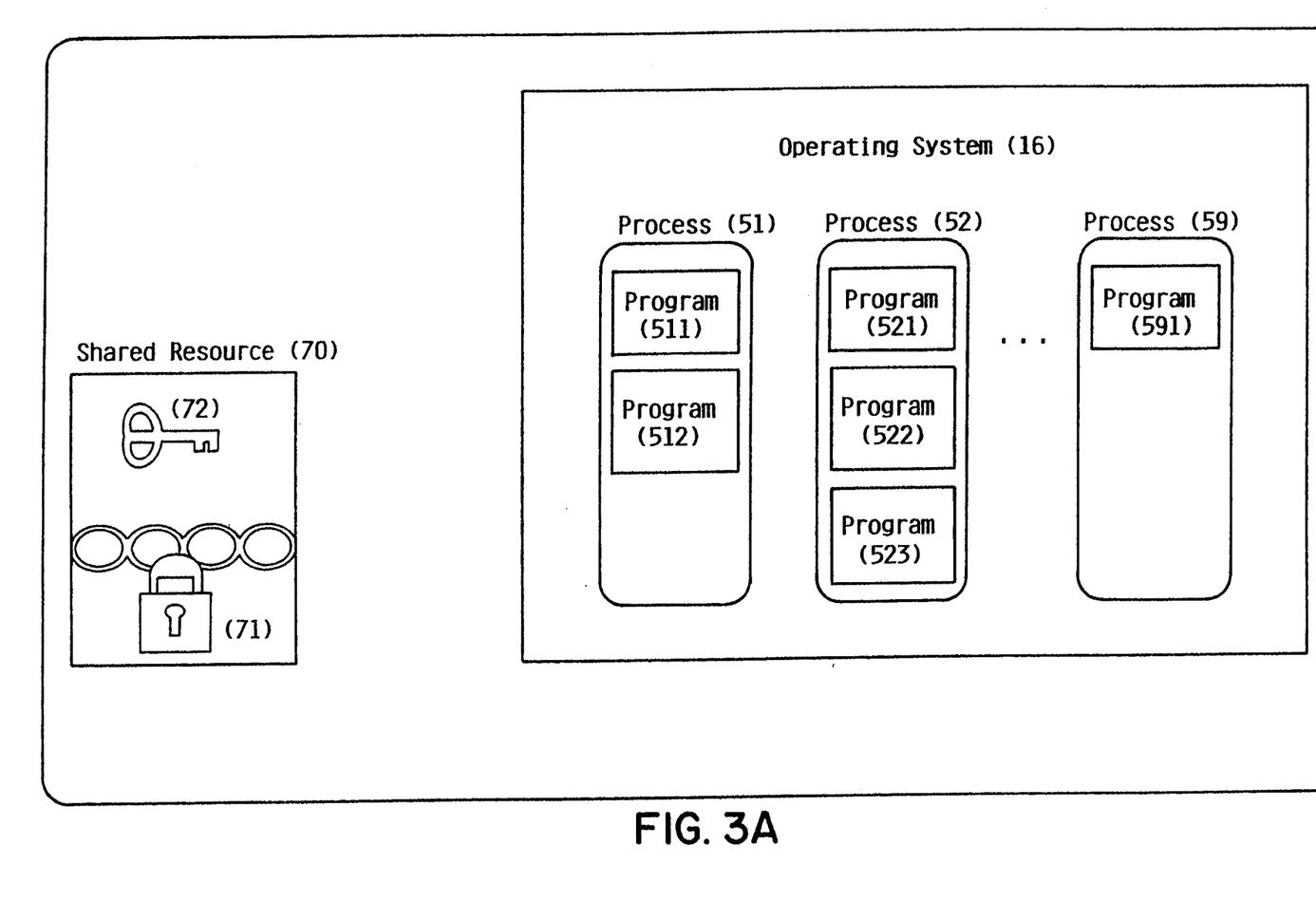
FIGS. 3A-3B show an example of the failure of process level locking of a shared computer resource in a hypothetical computer environment capable of supporting multiple asynchronous programs running within a single process.
Figure 3B:
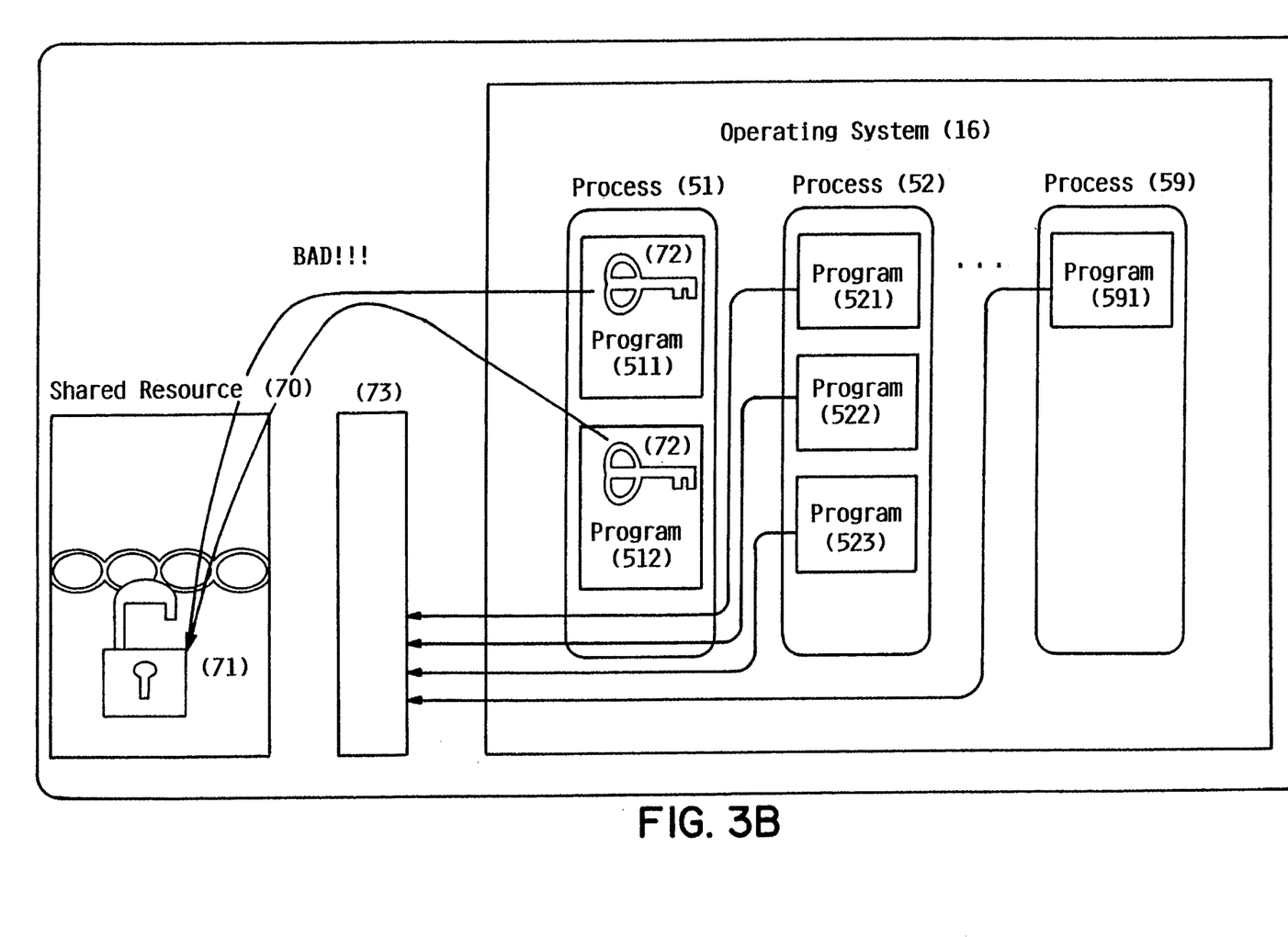

FIGS. 3A-3B show an example of the failure of process level locking of a shared computer resource in a hypothetical computing environment that supports multiple asynchronous programs running within a single process. As shown in FIG. 3A, process 51 contains programs 511 and 512. Process 52 contains programs 521, 522, and 523. Process 59 contains program 591. Each program is capable of operating asynchronously with other programs. FIG. 3B shows what happens when program 511 wants to use shared resource 70 if process level locking is used. Operating system 16 grants key 72 to process 51. The effect of this operation can be shown by symbolically providing key 72 to every program running within process 51. While operating system 16 would prevent programs executing within processes 52-59 from using shared resource 70, it does not prevent program 512 from using shared resource 70 when program 511 is using it. In effect, program 512 is allowed to skip over brick wall 73 to get at shared resource 70, causing possible problems with data integrity, system integrity, or even the operation of computer system 10. As shown graphically in FIG. 3B, this is undesirable.

Figure 3C:
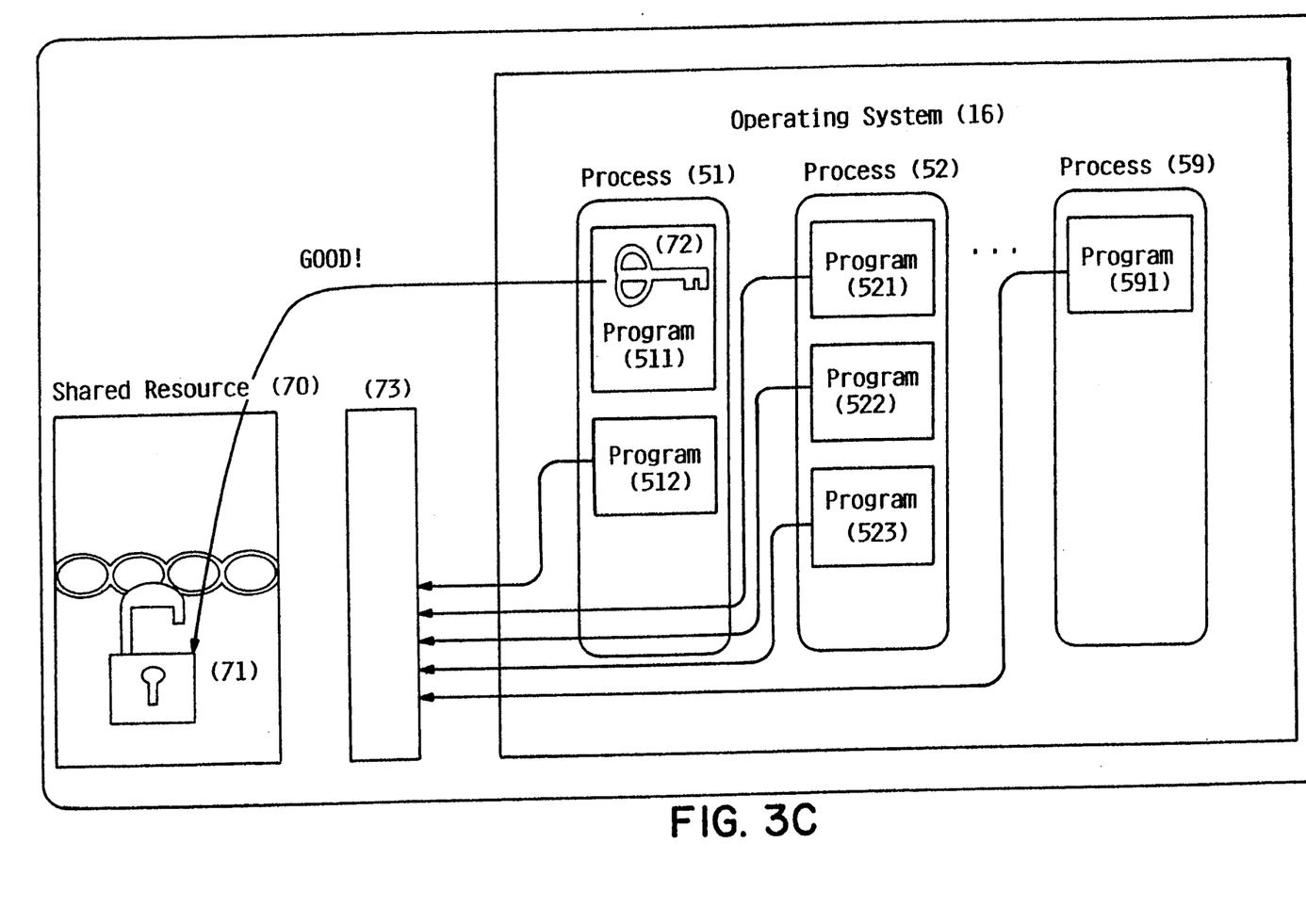
FIG. 3C shows the intraprocess, or program level locking of a shared computer resource in the computer environment capable of supporting multiple asynchronous programs running within a single process of the invention.

FIG. 3C shows the intraprocess, or program level locking of a shared computer resource in the computer environment that supports multiple asynchronous programs running within a single process of the invention. When program 511 wants to use shared resource 70, Operating system 16 symbolically moves key 72 from shared resource 70 only to program 511. Operating system 16 prevents not only programs executing within processes 52-59 from using shared resource 70, it also prevents program 512 from using shared resource 70 when program 511 is using it. As shown graphically in FIG. 3C, this solves the problems caused by process level locking of FIG. 3B.

While only three processes are shown and nine processes are implied by the numbering system in FIGS. 3A-3C, operating system 16 may contain anywhere from one to thousands of processes, based on the capacity of computer system 10. In addition, while at least one process must contain at least two asynchronously executing programs to fall within the scope of this invention, that process may contain thousands of asynchronously executing programs, and other processes may have anywhere from one to thousands of asynchronously executing programs.

Figure 4:
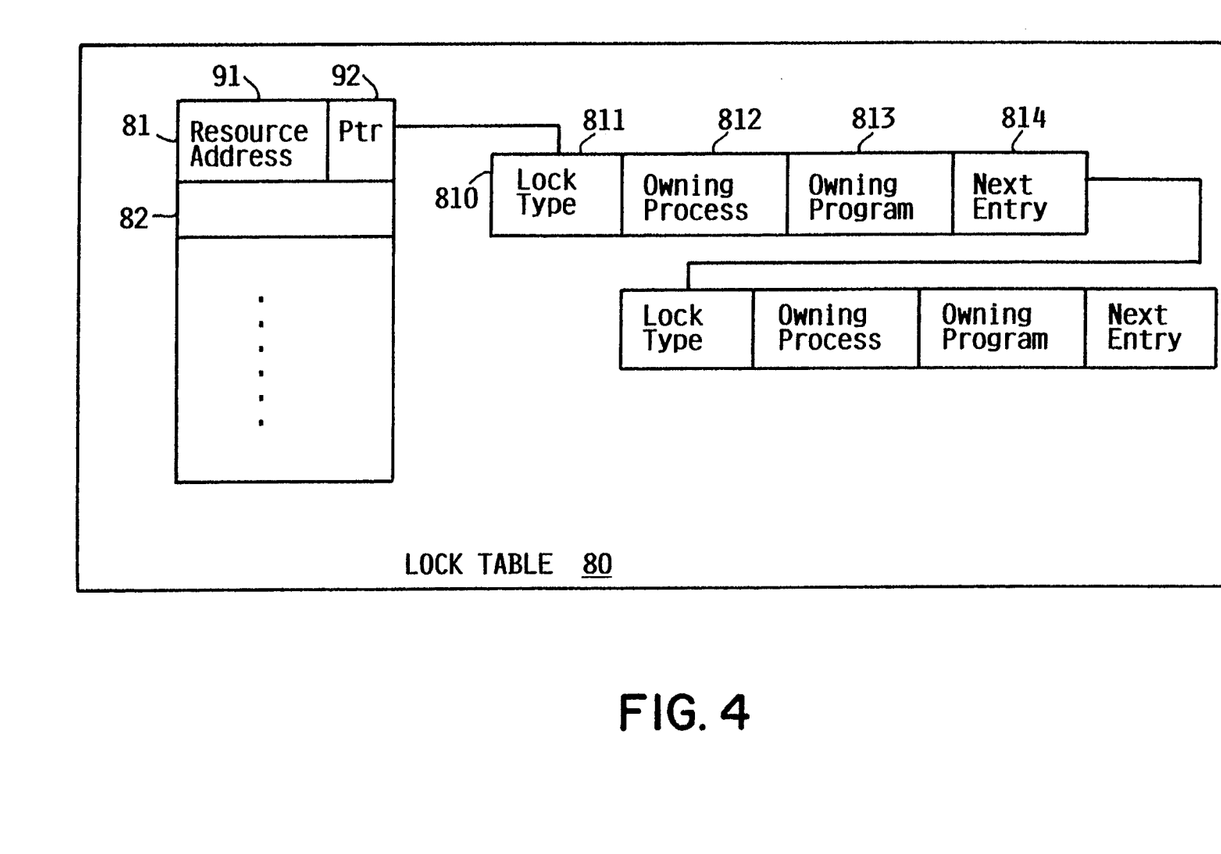
FIG. 4 shows the structure of the lock table of the invention.

FIG. 4 shows the structure of lock table 80 of the invention. Lock table 80 contains a plurality of hash entries, such as hash entry 81. Each hash entry contains resource address field 91 and pointer field 92. Resource address field 91 contains the address of the shared resource for which locking is desirable. For example, a shared resource could be any physical device (i.e. tape drive, workstation, diskette drive, etc), or any logical device (i.e. file, data area, message queue, etc) on the system that two programs might need to share.

Pointer field 92 points to first lock entry 810 for this resource address. Since this invention supports more than one type of lock per resource address, as will be discussed in more detail below, provisions for more than one lock entry per resource address is made. Each lock entry contains lock type field 811, owning process field 812, owning program field 813, and next entry field 814. If more than one lock entry is present for an object address (as is the case for non exclusive locks, as will be described below), next entry field 814 points to the beginning of the next lock entry, as is shown in FIG. 4. The use of the fields shown in FIG. 4 will be described in more detail in conjunction with the discussion of the operation of the flowcharts of FIGS. 5A-5B and FIG. 6.

Figure 5A:
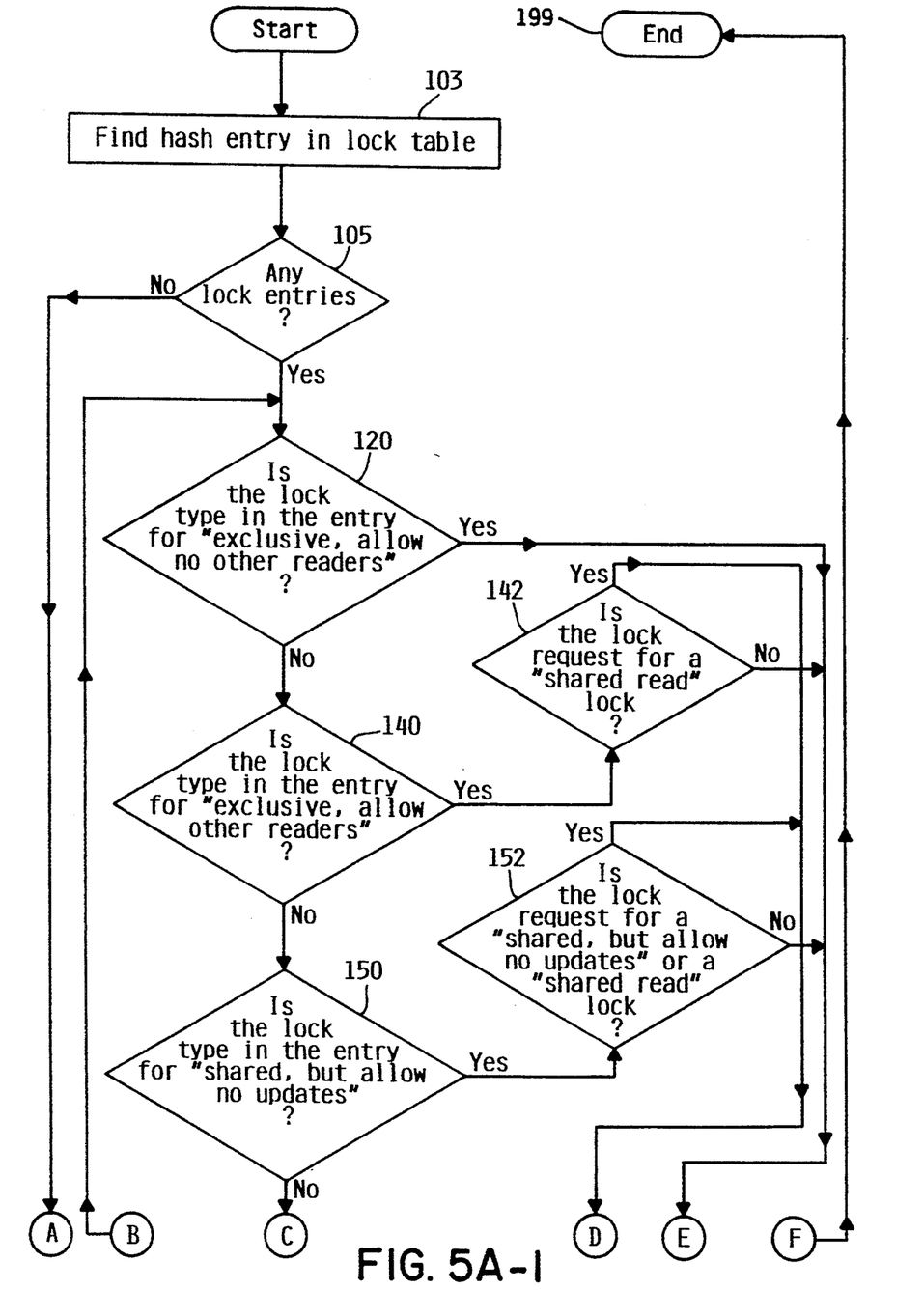
FIGS. 5A-5B show the flowchart of the invention used to process requests from a program to use a resource.
Figure 5A:
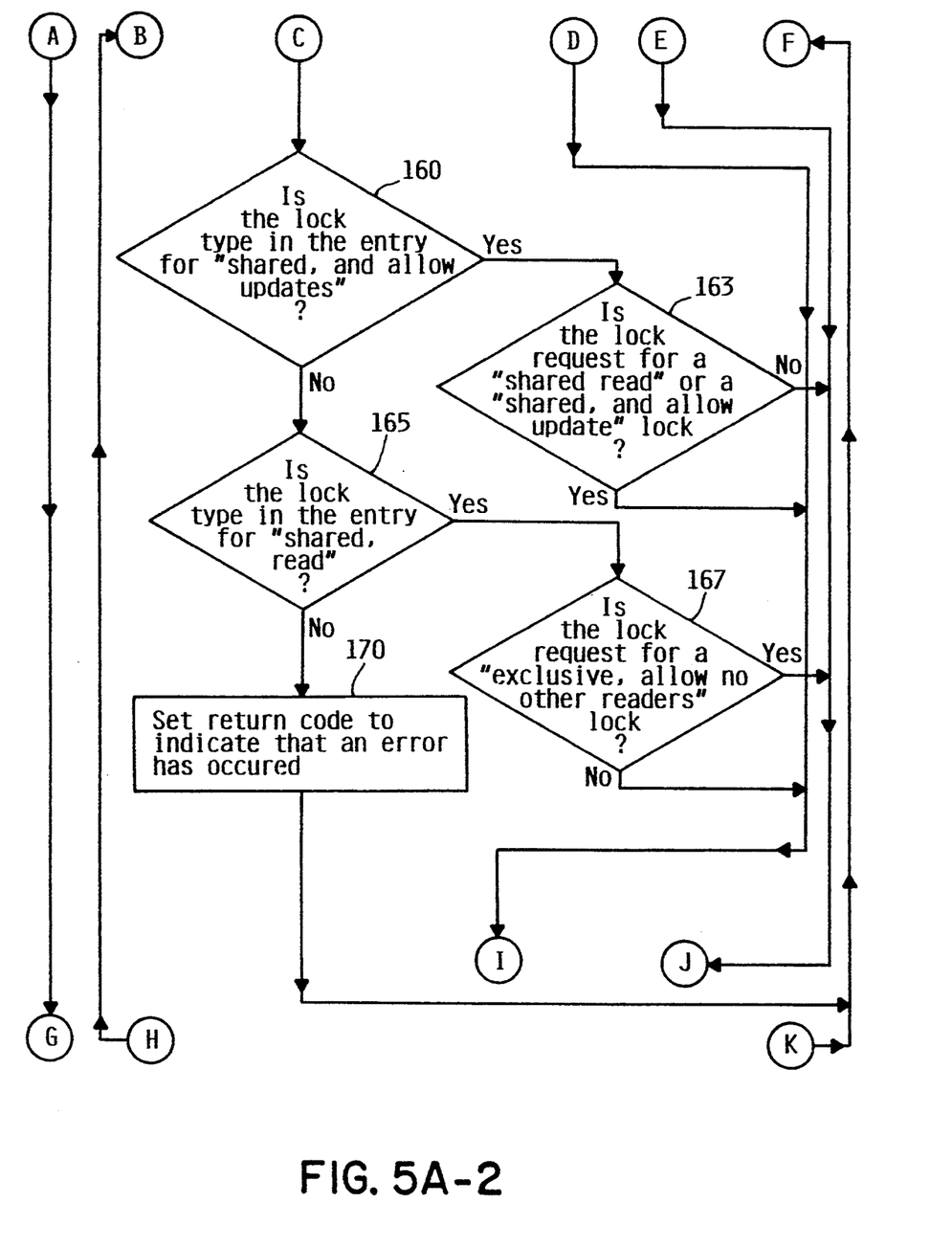
Figure 5B:
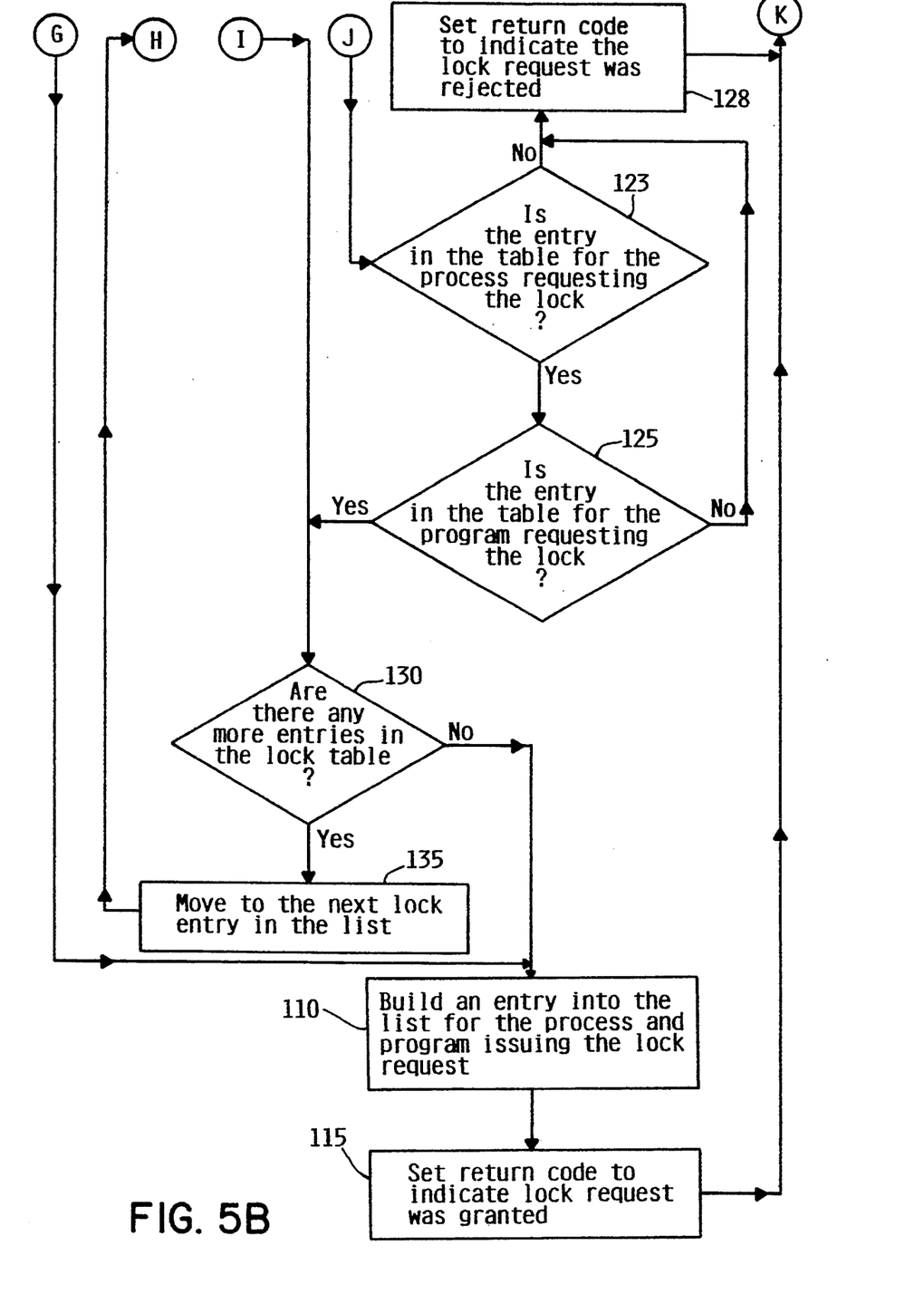

FIGS. 5A–5B show the flowchart of the invention used to process requests from a program to use a resource, as executed by suitably programmed processor(s) 12 of computer system 10 of FIG. 1, under the direction of operating system 16. Block 103 finds the hash entry in lock table 80 for the resource address associated with the resource the program has requested to use. Block 105 asks if there are any lock entries for this resource address. If the hash entry for this resource contains an empty pointer field 92 is empty (as will be the case for the first program wanting to use the resource) block 105 is answered negatively, and flow of control moves to block 110 of FIG. 5B.

Block 110 builds lock entry 810 (FIG. 4). Information for lock type field 811, owning process 812, and owning program 813 is provided by the program when use of the resource is requested. Next entry field 814 is left empty at this time, since there is currently only one lock entry for this resource address. Since this is the first lock entry for this resource address, block 110 inputs the address of this lock entry into pointer field 92 of the hash entry for this resource address. Block 115 sets a return code to let the program know that the requested lock was successfully obtained, and the flowchart ends at block 199.

When a program requests to use a resource for which a program has obtained a lock in the manner discussed above, block 105 is answered affirmatively, and flow of control moves to block 120. Block 120 reads the lock type from lock type entry field 811 to determine if this lock type was "exclusive, allow no other readers". If so, blocks 123, 125, and 128 operate to reject the request unless the entry in the lock table is for the same program in the same process requesting the lock. Under certain circumstances, it may be desirable for a program to have more than one lock on the same resource. For example, a program may want to have a shared lock on a resource most of the time, but may want to request and receive an exclusive lock during certain operations. This can be done without giving up the shared lock it already possesses. If block 125 is answered affirmatively, block 130 checks next entry field 814 to see if there is another lock entry for this resource address. If so, block 135 moves to the next lock entry, and returns to block 120. If not, block 110 builds a new lock entry, as previously discussed, except that block 110 updates next entry field 114 in the lock entry in the chain proceeding this lock entry.

If block 120 determines that the lock type was not "exclusive, allow no other readers", block 140 checks to see if the lock type was "exclusive, allow other readers". If so, block 142 asks if the lock request was for a "shared read" lock type. If so, the lock request does not conflict with this lock entry, and block 130 checks to see if there is another entry in the lock table, as has been discussed. If another type of lock was requested, block 142 is answered negatively, and blocks 123, 125, and 128 operate to reject the request unless the entry in the lock table is for the same program in the same process requesting the lock, as has already been discussed.

If block 140 determines that the lock type was not "exclusive, allow other readers", block 150 checks to see if the lock type in the lock entry was "shared, but allow no updates". If so, block 152 asks if the lock request was for a "shared read" or a "shared but allow no updates" lock type. If so, the lock request does not conflict with this lock entry, and block 130 checks to see if there is another entry in the lock table, as has been discussed. If another type of lock was requested, block 152 is answered negatively, and blocks 123, 125, and 128 operate to reject the request unless the entry in the lock table is for the same program in the same process requesting the lock, as has already been discussed.

If block 150 determines that the lock type was not "shared, but allow no updates", block 160 checks to see if the lock type in the lock entry was "shared, and allow no updates". If so, block 163 asks if the lock request was for a "shared read" or a "shared update" lock type. If so, the lock request does not conflict with this lock entry, and block 130 checks to see if there is another entry in the lock table, as has been discussed. If another type of lock was requested, block 163 is answered negatively, and blocks 123, 125, and 128 operate to reject the request unless the entry in the lock table is for the same program in the same process requesting the lock, as has already been discussed.

If block 160 determines that the lock type was not "shared, and allow updates", block 165 checks to see if the lock type in the lock entry was "shared, read". If so, block 167 asks if the lock request was for a "exclusive, allow no other readers" lock type. If not, the lock request does not conflict with this lock entry, and block 130 checks to see if there is another entry in the lock table, as has been discussed. If block 167 is answered affirmatively, blocks 123, 125, and 128 operate to reject the request unless the entry in the lock table is for the same program in the same process requesting the lock, as has already been discussed.

If block 160 is answered negatively, the lock type requested is not supported, and block 170 sets a return code to inform the program of the error. The flowchart ends in block 199.

Figure 6:
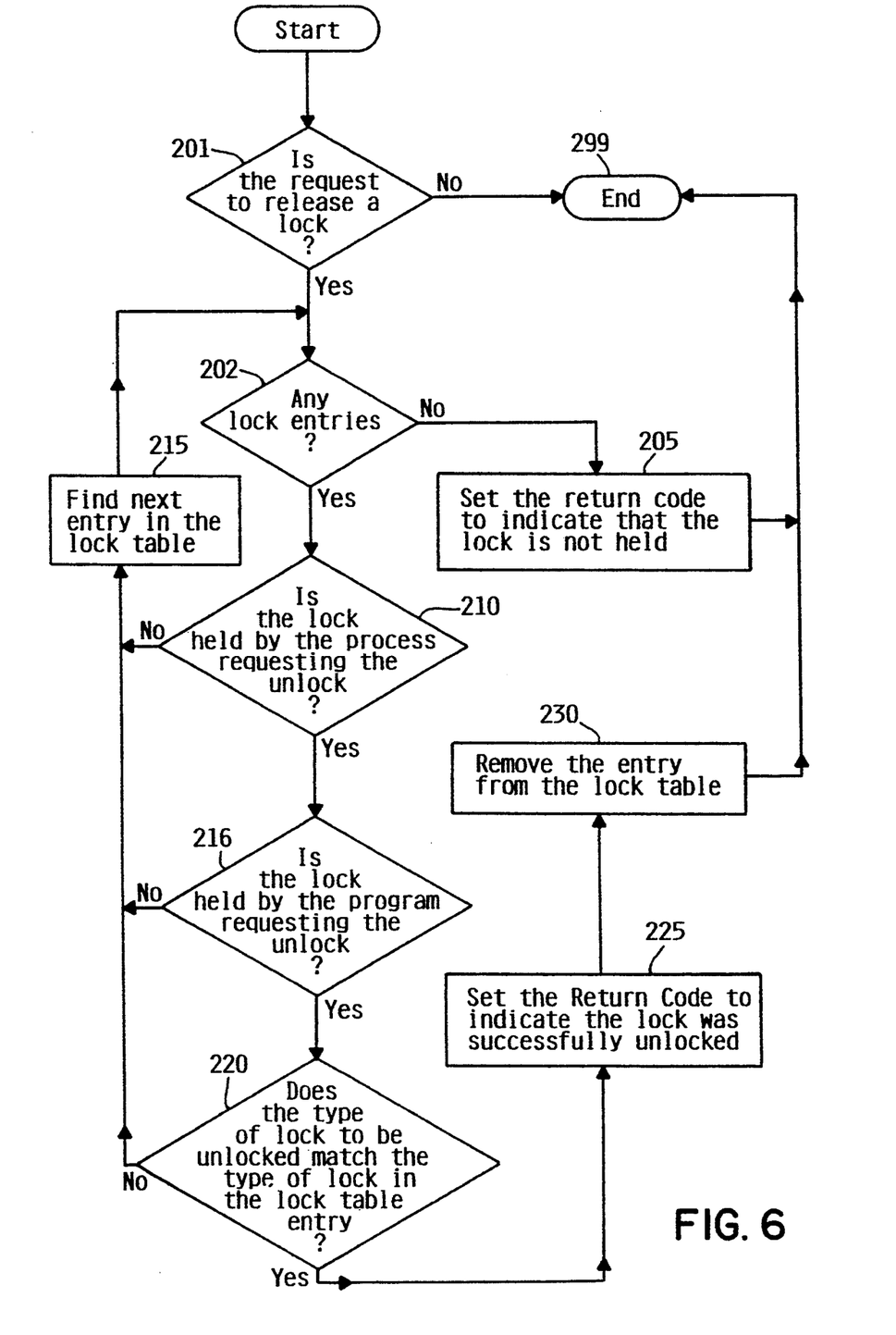
FIG. 6 shows the flowchart of the invention used to process requests from a program to remove a lock for a resource.

When a program no longer needs a lock, the flowchart of FIG. 6 is executed. Block 201 asks if a request has been received to release a lock for a resource. If so, block 202 checks the hash entry for this resource to see if there are any lock entries. If not, block 205 sets a return code to indicate to the program that there is no lock held for this resource, and the program ends in block 299. If so, block 210 checks the owning process field of the lock entry for this resource to see if the lock is held by the process requesting the release of the lock. If not, this program cannot release the lock specified in this lock entry, and block 215 looks for another entry in the lock table for this resource, if any. Flow of control returns to block 202.

If block 210 is answered affirmatively, block 216 checks the owning program field of the lock entry for this resource to see if the lock is held by the program requesting the release of the lock. If not, this program cannot release the lock specified in this lock entry, and block 215 looks for another entry in the lock table for this resource, if any. Flow of control returns to block 202.

If block 216 is answered affirmatively, block 220 checks the lock type field of the lock entry for this resource to see if the lock is held by the program requesting the release of the lock. If not, this program cannot release the lock specified in this lock entry, and block 215 looks for another entry in the lock table for this resource, if any. Flow of control returns to block 202.

If block 220 is answered affirmatively, this program has the authority to remove this lock type for this resource, and block 225 sets the return code to inform the program that the lock was successfully released. Block 230 then removes the lock entry from the lock table and revises the pointer in the next entry field of the lock entry upchain from the lock entry that was removed. If this was the last lock entry for this resource, pointer field 92 in the hash entry for this resource is nulled.

An alternate embodiment to the invention would support only one lock type: "exclusive, allow no other readers". For this embodiment, there would only be one lock entry for each resource address, so next entry field 814 would not be necessary, nor would lock type field 811. The flowchart of FIGS. 5A-5B would be simplified greatly, with the yes branch of block 105 moving directly to block 123.

While this invention has been described with respect to the preferred and alternate embodiments, it will be understood by those skilled in the art that various changes in detail may be made therein without departing from the spirit, scope and teaching of the invention. For example, the lock types could be different than those discussed above. Accordingly, the herein disclosed is to be limited only as specified in the following claims.

What is claimed is:

1. A method for locking a resource shared between a first asynchronous program and a second asynchronous program, comprising the steps of:
   receiving a request from said first asynchronous program to use said resource, said first asynchronous program executing within a first process, said request being received by an operating system;
   checking a lock table to see if said second asynchronous program has acquired a lock for said resource, said second asynchronous program executing within said first process, said lock table being checked by said operating system;
   granting said request if said checking step indicates that said second asynchronous program has not acquired a lock for said resource, said request being granted by said operating system; and
   denying said request if said checking step indicates that said second asynchronous program has acquired a lock for said resource, said request being denied by said operating system.

2. A method for locking a resource shared between a first asynchronous program and a second asynchronous program, comprising the steps of:
   receiving a first request from said first asynchronous program to use said resource, said first asynchronous program executing in a first process, said first request being received by an operating system;
   checking a lock table to see if said second asynchronous program has acquired a lock for said resource, said second asynchronous program executing in said first process, said lock table being checked by said operating system;
   granting said first request based on an indication from said checking step that said second asynchronous program has not acquired a lock for said resource, said first request being granted by said operating system;
   receiving a second request from said second asynchronous program to use said resource, said second request being received by said operating system;
   checking a lock table to see if said first asynchronous program has acquired a lock for said resource, said lock table being checked by said operating system; and
   denying said second request based on an indication from said checking step that said second asynchronous program has acquired a lock for said resource, said second request being denied by said operating system.

3. A method for locking a resource shared between a first asynchronous program and a second asynchronous program, and a third asynchronous program, said method comprising the steps of:
   receiving a first request from said first asynchronous program to use said resource, said first asynchronous program executing within a first process, said first request being received by an operating system;
   first checking a lock table to see if said second asynchronous program or said third asynchronous program has acquired a lock for said resource, said second asynchronous program executing within said first process, said third asynchronous program executing within a second process, said lock table being checked by said operating system;
   granting said first request based on an indication from said first checking step that said second asynchronous program or said third asynchronous program has not acquired a lock for said resource, said first request being granted by said operating system;
   receiving a second request from said second asynchronous program to use said resource, said second request being received by said operating system;
   second checking a lock table to see if said first asynchronous program or said second asynchronous program has acquired a lock for said resource, said lock table being checked by said operating system;
   denying said second request based on an indication from said checking step that said first asynchronous program has acquired a lock for said resource, said second request being denied by said operating system;
   receiving a third request from said third asynchronous program to use said resource, said third request being received by said operating system;
   checking a lock table to see if said first asynchronous program or said second asynchronous program has acquired a lock for said resource, said lock table being checked by said operating system; and
   denying said third request based on an indication from said checking step that said first asynchronous program has acquired a lock for said resource, said third request being denied by said operating system.

4. A computer system for locking a resource shared between a first asynchronous program and a second asynchronous program, comprising:
   means for receiving a first request from said first asynchronous program for a first lock type to use said resource, said first asynchronous program executing within a first process, said first request being received by an operating system;
   means for checking a lock table to see if said second asynchronous program has acquired a second lock type for said resource that would conflict with said first lock type requested by said first asynchronous program, said second asynchronous program executing within said first process, said lock table being checked by said operating system;
   means for granting said first request based on an indication from said checking means that said second lock type does not conflict with said first lock type, said first request being granted by said operating system.

5. The computer system of claim 4, wherein said second lock type is an exclusive allow other readers lock type and said first lock type is a shared read lock type.

6. The computer system of claim 4, wherein said second lock type is a shared but allow no updates lock type and said first lock type is a shared read lock type.

7. The computer system of claim 4, wherein said second lock type is a shared and allow updates lock type and said first lock type is a shared read lock type.

8. The computer system of claim 4, wherein said second lock type is a shared and allow updates lock type and said first lock type is a shared and allow update lock type.

9. The computer system of claim 4, wherein said second lock type is a shared read lock type and said first lock type is a shared read lock type.

10. The computer system of claim 4, wherein said second lock type is a shared read lock type and said first lock type is a shared read lock type.

11. The computer system of claim 4, wherein said second lock type is a shared read lock type and said first lock type is a shared and allow update lock type.

12. A computer system for locking a resource shared between a first asynchronous program and a second asynchronous program, comprising:

means for receiving a request from said first asynchronous program to use said resource, said first asynchronous program executing within a first process, said request being received by an operating system;

means for checking a lock table to see if said second asynchronous program has acquired a lock for said resource, said second asynchronous program executing within said first process, said lock table being checked by said operating system;

means for granting said request if said checking means indicates that said second asynchronous program has not acquired a lock for said resource, said request being granted by said operating system; and means for denying said request if said checking means indicates that said second asynchronous program has acquired a lock for said resource, said request being denied by said operating system.

* * * * *